United States Patent
Jo

(10) Patent No.: US 9,421,941 B2
(45) Date of Patent: Aug. 23, 2016

(54) CUSHION OF CURTAIN AIR BAG DEVICE

(71) Applicant: Hyundai Mobis Co., Ltd., Seoul (KR)

(72) Inventor: Kum Ho Jo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/694,574

(22) Filed: Apr. 23, 2015

(65) Prior Publication Data

US 2015/0307053 A1 Oct. 29, 2015

(30) Foreign Application Priority Data

Apr. 29, 2014 (KR) .................. 10-2014-0051700

(51) Int. Cl.
*B60R 21/232* (2011.01)
*B60R 21/237* (2006.01)

(52) U.S. Cl.
CPC ............ *B60R 21/232* (2013.01); *B60R 21/237* (2013.01)

(58) Field of Classification Search
CPC ................................. B62D 1/184; B62D 1/19
See application file for complete search history.

(56) References Cited

U.S. PATENT DOCUMENTS

| | | | |
|---|---|---|---|
| 4,290,627 A * | 9/1981 | Cumming | B60R 21/233 280/729 |
| 5,482,318 A | 1/1996 | Sollars | |
| 6,481,743 B1 | 11/2002 | Tobe et al. | |
| 7,207,594 B2 | 4/2007 | Igawa et al. | |
| 7,513,523 B2 | 4/2009 | Bayley et al. | |
| 7,967,332 B2 | 6/2011 | Karlsson | |
| 8,020,888 B2 | 9/2011 | Cheal et al. | |
| 8,042,831 B2 | 10/2011 | Hoffman et al. | |
| 8,186,708 B2 | 5/2012 | Zhou et al. | |
| 8,414,021 B2 | 4/2013 | Tanaka et al. | |
| 8,770,617 B2 | 7/2014 | Abele et al. | |
| 8,770,618 B2 | 7/2014 | Fukawatase et al. | |
| 9,108,588 B2 | 8/2015 | Fukawatase | |
| 2003/0178831 A1 | 9/2003 | Roberts et al. | |
| 2004/0007857 A1 | 1/2004 | Sonnenberg et al. | |
| 2004/0119270 A1 | 6/2004 | Gu et al. | |
| 2004/0256841 A1* | 12/2004 | Bakhsh | B60R 21/02 280/730.1 |
| 2006/0131847 A1 | 6/2006 | Sato et al. | |
| 2006/0249943 A1 | 11/2006 | Bauer et al. | |

(Continued)

FOREIGN PATENT DOCUMENTS

| | | |
|---|---|---|
| JP | 2003-146176 | 5/2003 |
| JP | 2012-96628 | 5/2012 |

(Continued)

OTHER PUBLICATIONS

Non-Final Office Action issued Feb. 10, 2016, in U.S. Appl. No. 14/695,423.

(Continued)

*Primary Examiner* — Darlene P Condra
(74) *Attorney, Agent, or Firm* — H.C. Park & Associates, PLC

(57) ABSTRACT

A cushion of a curtain air bag device including: a single-layer chamber receiving gas from an inflator and spreading to form a single gas layer, when a vehicle is involved in a collision; a multilayer chamber having a structure in which a plurality of layers overlap each other, and communicating with the single-layer chamber; a sealing part sealing edges of the single-layer chamber and the multilayer chamber; and a coupling part integrally connecting an overlapping part of the sealing part formed at the edge of the multilayer chamber.

12 Claims, 4 Drawing Sheets

(56) References Cited

U.S. PATENT DOCUMENTS

| | | | |
|---|---|---|---|
| 2007/0040361 A1* | 2/2007 | Bayley | B60R 21/232 280/730.2 |
| 2008/0012275 A1 | 1/2008 | Pinsenschaum et al. | |
| 2008/0079246 A1 | 4/2008 | Dix | |
| 2008/0129023 A1 | 6/2008 | Heigl et al. | |
| 2010/0032930 A1 | 2/2010 | Yamamura et al. | |
| 2010/0219620 A1* | 9/2010 | Jaramillo | B60R 21/232 280/730.2 |
| 2010/0253055 A1* | 10/2010 | Schneider | B60R 21/2171 280/742 |
| 2011/0079990 A1 | 4/2011 | Cheal et al. | |
| 2011/0260436 A1 | 10/2011 | Park et al. | |
| 2012/0001409 A1 | 1/2012 | Azuma et al. | |
| 2012/0235388 A1 | 9/2012 | Suzuki | |
| 2012/0286500 A1* | 11/2012 | Wiik | B60R 21/213 280/730.2 |
| 2013/0001933 A1 | 1/2013 | Umehara et al. | |
| 2013/0229002 A1* | 9/2013 | Enders | B60R 21/201 280/728.2 |
| 2014/0042732 A1 | 2/2014 | Taguchi et al. | |
| 2014/0091562 A1* | 4/2014 | Sugimoto | B60R 21/231 280/743.1 |
| 2014/0217707 A1 | 8/2014 | Konishi et al. | |
| 2014/0217710 A1 | 8/2014 | Fukawatase et al. | |
| 2014/0239619 A1 | 8/2014 | Fukawatase et al. | |
| 2014/0239620 A1 | 8/2014 | Kawamura et al. | |
| 2014/0239621 A1 | 8/2014 | Kawamura et al. | |
| 2014/0333053 A1 | 11/2014 | Thomas et al. | |
| 2015/0084316 A1 | 3/2015 | Okuhara et al. | |
| 2015/0145234 A1 | 5/2015 | Wang et al. | |
| 2015/0307053 A1 | 10/2015 | Jo | |

FOREIGN PATENT DOCUMENTS

| | | |
|---|---|---|
| JP | 2014-15104 | 1/2014 |
| JP | 2014-037159 | 2/2014 |
| JP | 2014-151734 | 8/2014 |
| JP | 2014-166796 | 9/2014 |
| JP | 2014-166798 | 9/2014 |
| KR | 10-2008-0008109 | 1/2008 |
| KR | 10-2012-0041505 | 5/2012 |

OTHER PUBLICATIONS

Non-Final Office Action issued Jan. 13, 2016, in U.S. Appl. No. 14/695,380.

Non-Final Office Action issued Jan. 22, 2016, in U.S. Appl. No. 14/688,570.

Non-Final Office Action issued on Jan. 13, 2016, in U.S. Appl. No. 14/695,380.

* cited by examiner

SECTION A-A'

SECTION B-B'

SECTION A-A'

SECTION B-B'

CUSHION OF CURTAIN AIR BAG DEVICE

CROSS-REFERENCE TO RELATED APPLICATION

This application claims priority from and the benefit of Korean Patent Application No. 10-2014-0051700, filed on Apr. 29, 2014, which is hereby incorporated by reference for all purposes as if fully set forth herein.

BACKGROUND

1. Field

Exemplary embodiments relate to a cushion of a curtain air bag device, and more particularly, to a cushion of a curtain air bag device installed in a vehicle so as to protect a passenger from a side part of the vehicle when the vehicle collides.

2. Discussion of the Background

In general, an air bag is installed in the center of a steering wheel or in a crash pad at the front of a passenger seat, and protects the upper body and face of a driver or a passenger in the passenger seat during a collision accident. Furthermore, in order to maximize the protection effect of the air bag, another air bag is installed in a side part of the seat or a roof side rail, and protects the passenger from the impact of a lateral collision or an oblique collision.

Among the air bags, the air bag installed in the roof side rail is referred to as a "curtain" air bag. This is because the curtain air bag covers a door glass when the air bag is completely spread downward from the roof side rail, similar to a curtain installed on a window.

When a collision occurs, a control unit recognizing the collision through an impact sensor activates an inflator to generate gas. Then, the generated gas is introduced into a cushion of the curtain air bag device. The cushion of the curtain air bag device is spread from the side parts of the front and rear seats in order to protect passengers.

According to the above-described cushion of the curtain air bag device, when another vehicle collides with the vehicle in an oblique direction, the passenger may be injured as a result of the passenger's head being inserted into a space between the curtain air bag at the side and a driver air bag at the front, without bumping against the drive air bag or the curtain air bag, or by being rapidly tilted in the right or left direction. Thus, there is a demand for a structure capable of solving such a problem.

The related art of the present invention is disclosed in Korean Patent Laid-open Publication No. 10-2008-0008109, published on Jan. 23, 2008 and entitled "Cushion of Curtain Air Bag Device".

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a cushion of a curtain air bag device which is capable of reducing the likelihood and/or severity of injury to a passenger that may occur when the head of the passenger is inserted into a space between a drive air bag and the curtain air bag, or when the head is rapidly tilted in the left or right direction.

Additional aspects will be set forth in the detailed description which follows, and, in part, will be apparent from the disclosure, or may be learned by practice of the inventive concept.

An exemplary embodiment discloses a cushion of a curtain air bag device including: a single-layer chamber receiving gas from an inflator and spreading to form a single gas layer when a vehicle is involved in a collision; a multilayer chamber having a structure in which a plurality of layers overlap each other, and communicating with the single-layer chamber; a sealing part sealing edges of the single-layer chamber and the multilayer chamber; and a coupling part integrally connecting an overlapping part of the sealing part formed at the edge of the multilayer chamber.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
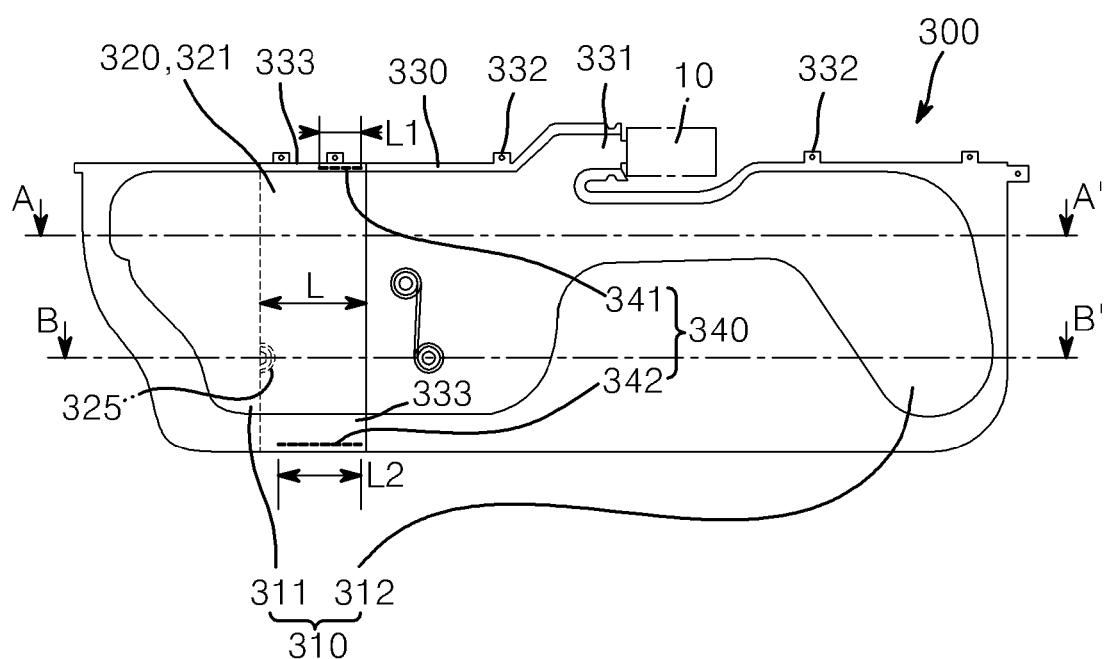
FIG. 1 is a side view schematically illustrating a cushion of a curtain air bag device in accordance with an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
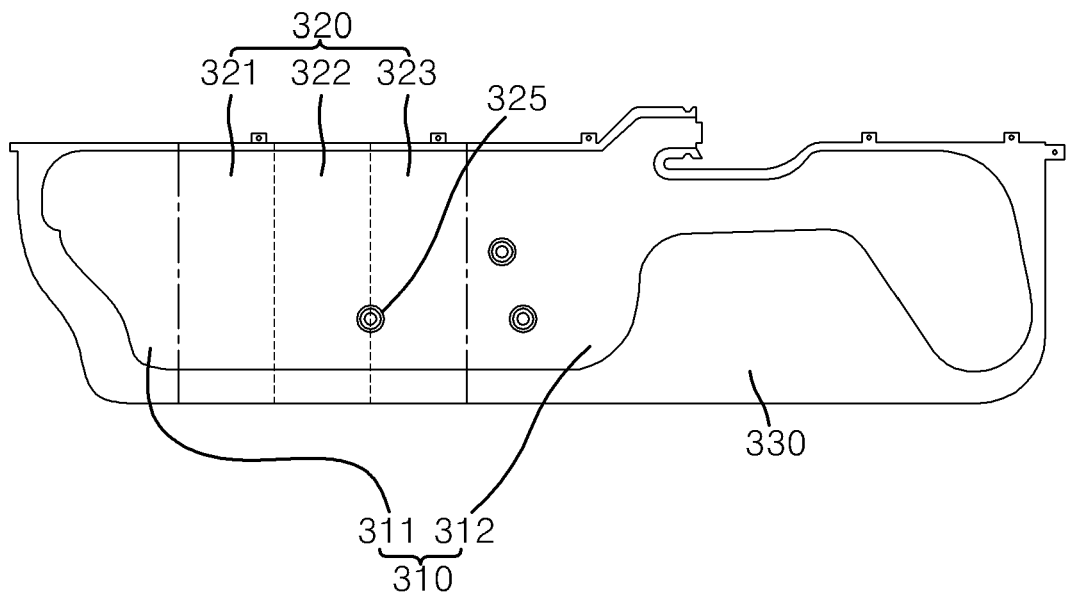
FIG. 2 is a side view schematically illustrating the cushion of the curtain air bag device prior to the folding of a multilayer chamber.

FIG. 1 is a side view schematically illustrating a cushion of a curtain air bag device in accordance with an embodiment of the present invention. FIG. 2 is a side view schematically illustrating the cushion of the curtain air bag device prior to the folding of a multilayer chamber.

Referring to FIGS. 1 and 2, the cushion 300 of the curtain air bag device in accordance with an exemplary embodiment of the present invention may include a single-layer chamber 310, a multilayer chamber 320, a sealing part 330, and a coupling part 340. In the following descriptions, suppose that the left side and the right side of FIGS. 1 and 2 are set to indicate the front side and the rear side, respectively, of a vehicle.

When the vehicle is involved in a collision, the single-layer chamber 310 may receive gas from the inflator 10 and spread to form a single gas layer extended from the front seat toward the rear seat. When the single-layer chamber 310 is spread, it may indicate that the single-layer chamber 310 is expanded.

The single-layer chamber 310 in accordance with the exemplary embodiment of the present invention may include a front chamber layer 311 and a rear chamber layer 312. The front chamber layer 311 may communicate with the front side of the multilayer chamber 320, and the rear chamber layer 312 may communicate with the rear side of the front chamber layer 311.

Figure 3A:
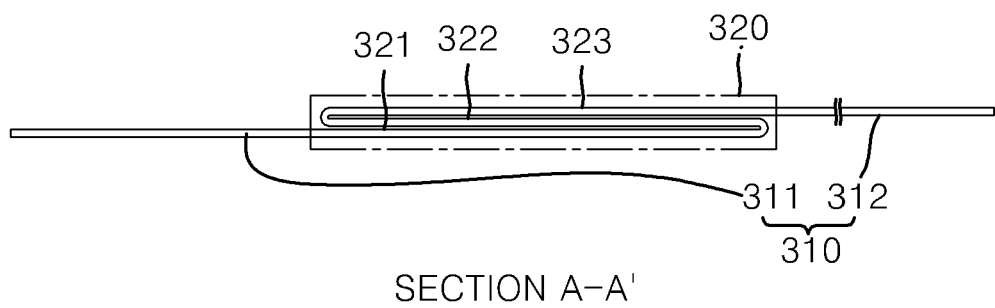
FIG. 3A and FIG. 3B are transverse cross-sectional views schematically illustrating the cushion of the curtain air bag device in accordance with an exemplary embodiment of the present invention.
Figure 3B:
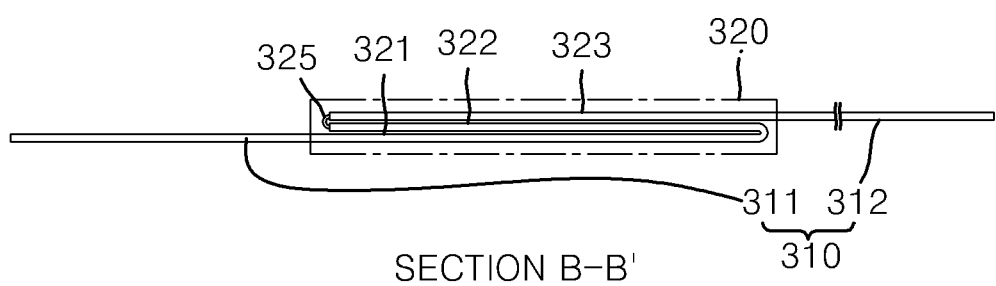
Figure 4A:
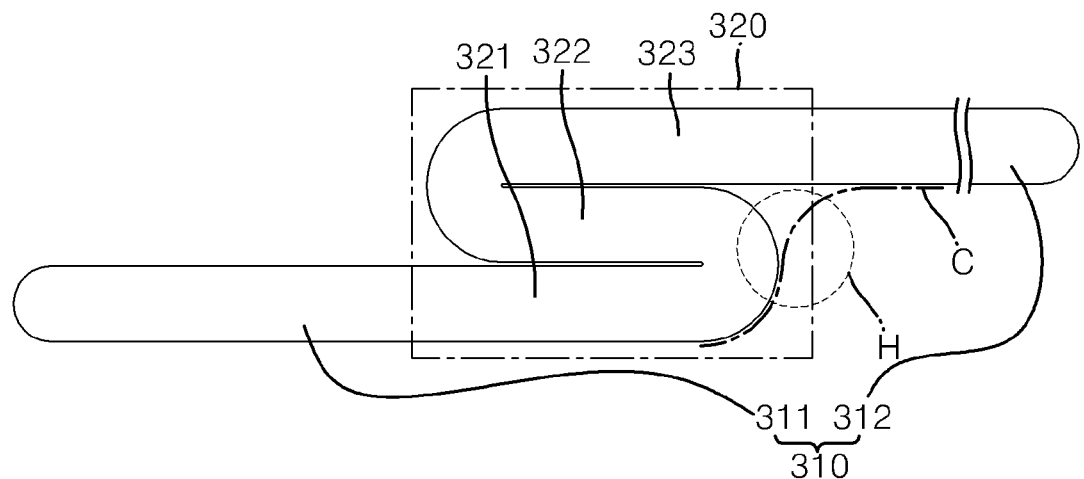
FIG. 4A and FIG. 4B are transverse cross-sectional views schematically illustrating a state in which the cushion of the curtain air bag device is spread.
Figure 4B:
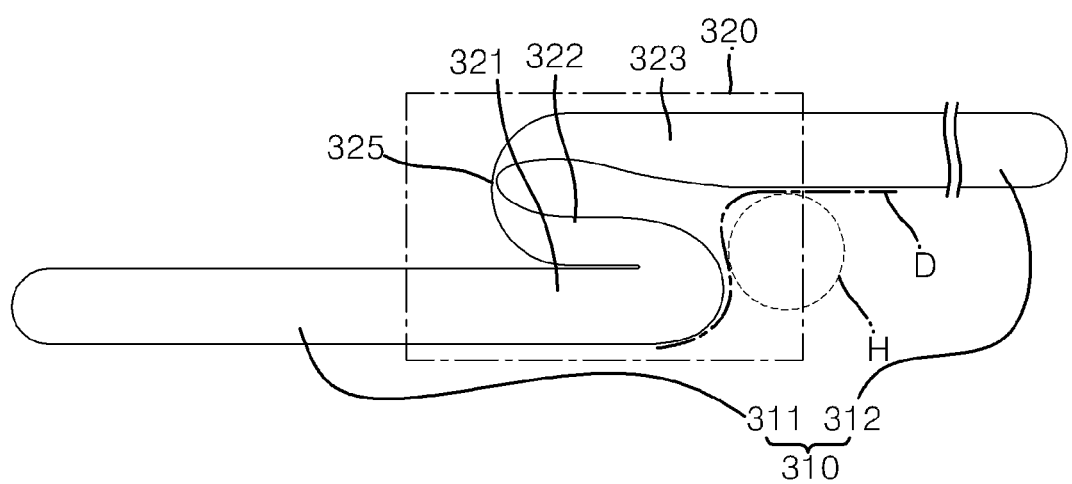

FIGS. 3A and 3B are transverse cross-sectional views schematically illustrating the cushion of the curtain air bag device in accordance with an exemplary embodiment of the present invention. FIGS. 4A and 4B are transverse cross-sectional views schematically illustrating a state in which the cushion of the curtain air bag device is spread.

FIGS. 3A and 4A are transverse cross-sectional views taken along A-A line positioned at the upper part of the multilayer chamber 320 in FIG. 1, and FIGS. 3B and 4B are transverse cross-sectional views taken along B-B' line positioned at the lower part of the multilayer chamber 320 in FIG. 1.

Referring to FIGS. 3A, 3B, 4A, and 4B, the multilayer chamber 320 in accordance with an exemplary embodiment of the present invention may have a multilayer structure in which a first chamber layer 321, a second chamber layer 322, and a third chamber layer 323 overlap each other.

The first chamber layer 321 may be formed to communicate with the front chamber layer 311, and extends from the front side toward the rear side. The second chamber layer 322 may be formed to communicate with the first chamber layer 321, and extends toward the front side while overlapping the first chamber layer 321. The third chamber layer 323 may be formed to communicate with the second chamber layer 322, and extends toward the rear side while overlapping the first and second chamber layers 321 and 322.

The cushion 300 of the curtain air bag device in accordance with an exemplary embodiment of the present invention may have a structure in which the front chamber layer 311, the first chamber layer 321, the second chamber layer 322, the third chamber layer 323, and the rear chamber layer 312 are successively connected to communicate with each other. Furthermore, when the cushion 300 is expanded, the multilayer chamber 320 having a structure in which the first to third chamber layers 321 to 323 overlap each other may protrude from the rear chamber layer 312.

Over the multilayer chamber 320, an inactive part 325 may be formed, which is not expanded even though gas is introduced into the multilayer chamber 320. The inactive part 325 may be formed by attaching or sewing one surface and the other surface of the multilayer chamber 320.

As the inactive part 325 is formed, the total thickness of the first to third chamber layers 321 to 323, or the adhesion among the first to third chamber layers 321 to 323 may not be uniform but differ depending on positions, when the multilayer chamber 320 is spread.

When the inactive part 325 is formed at the lower part of the boundary between the second and third chamber layers 322 and 323, as illustrated in FIGS. 1 to 3B, the lower part of the multilayer chamber 320 may have a thickness less than that of the upper part of the multilayer chamber 320, and the adhesion among the first to third chamber layers 321 to 323 at the lower part may be less than the adhesion at the upper part, in a state where the multilayer chamber 320 is spread, as illustrated in FIGS. 4A and 4B.

When the inactive part 325 is formed at the lower part of the multilayer chamber 320 at which the head H of a passenger is positioned, the upper part of the multilayer chamber 320 may be inflated to a greater degree than the lower part thereof as illustrated in FIGS. 4A and 4B. That is, the upper part of the multilayer chamber 320 may form a more convex shape than the lower part thereof.

This structure may be confirmed through FIGS. 4A and 4B illustrating that the head H of the passenger, coming in contact with a portion indicated by D in FIG. 4B, is positioned ahead of a portion indicated C in FIG. 4A.

Thus, when a side part of the head H of the passenger, for example, the face of the passenger, comes in contact with the lower part of the multilayer chamber 320 and the rear chamber layer 312, the top surface of the head H of the passenger may come in contact with the upper part of the multilayer chamber 320 at the same time. Therefore, when the vehicle collision occurs, the head H of the passenger may be stably protected while the single-layer chamber 310 and the multilayer chamber 320 simultaneously come in contact with the head H of the passenger.

The sealing part 330 may seal the edges of the singe-layer chamber 310 and the multilayer chamber 320. The sealing part 330 may have a gas introduction part 331 formed at one side thereof. The gas introduction part 331 may form a path through which the gas supplied from the inflator 10 is introduced to the single-layer chamber 310 and the multi-layer chamber 320 via the sealing part 330.

The sealing part 330 may have a plurality of mounting parts 332 formed at the top thereof. The plurality of mounting parts 332 may be successively arranged in the front-rear direction. Because the mounting parts 332 are coupled to the vehicle body, the cushion 300 of the curtain air bag device in accordance with an exemplary embodiment of the present invention may be installed to extend forward and backward on the vehicle body.

The coupling part 340 may be integrally connected to the sealing part 330 formed at the edge of the multilayer chamber 320. That is, the coupling part 340 may integrally connect an overlapping part 333 which includes a plurality of layers formed at each of the upper and lower parts of the multilayer chamber 320 so as to overlap each other. When the overlapping part 333 is integrally connected, it may indicate that the respective layers forming the overlapping part 333 are connected as one mass so as not to be separated or unfolded.

The coupling part 340 in accordance with an exemplary embodiment of the present invention may include an upper coupling part 341 and a lower coupling part 342. The upper coupling part 341 may couple the respective layers of the overlapping part 333 formed at the upper part of the multilayer chamber 320. The lower coupling part 342 may couple the respective layers of the overlapping part 333 formed at the lower part of the multilayer chamber 320. The upper coupling part 341 and the lower coupling part 342 may be formed by sewing the respective layers of the overlapping part 333 in the lateral direction.

When the coupling part 340 is formed in a state where both side surfaces of the multilayer chamber 320 are attached to each other, a portion of the multilayer chamber 320 that comes in contact with the coupling part 340 may not be inflated to the maximum, but the multilayer chamber 320 may be inflated more and more as the multilayer chamber 320 is isolated from the coupling part 340.

Thus, the thickness of the multilayer chamber 320 may differ according to the widths L1 and L2 of the upper and lower coupling parts 341 and 342 illustrated in FIG. 1. For example, as the width L1 of the upper coupling part 341 is increased, the thickness of the upper part of the multilayer chamber 320 may be reduced, and as the width L2 of the lower coupling part 342 is increased, the thickness of the lower part of the multilayer chamber 320 may be reduced.

Furthermore, depending on the positions of the upper and lower coupling parts 341 and 342, the multilayer chamber 320 may be spread in a different manner. In an exemplary embodiment of the present invention, the upper coupling part 341 and the lower coupling part 342 may be formed to be concentrated at the rear side for the entire width L of the second chamber layer 322.

When the upper coupling part 341 and the lower coupling part 342 are formed to be concentrated at the rear side, the multilayer chamber 320 may be spread in such a manner that the thickness thereof gradually increases toward the front side. On the other hand, when the upper coupling part 341 and the lower coupling part 342 are formed to be concentrated at the front side, the multilayer chamber 320 may be spread in such a manner that the thickness thereof gradually increases toward the rear side.

Furthermore, depending on a difference between the widths L1 and L2 of the upper and lower coupling parts 341 and 342, the multilayer chamber 320 may be spread in a different manner. When the width L2 of the lower coupling part 342 is greater than the width L1 of the upper coupling part 341, the lower part of the multilayer chamber 320 may be formed to have a smaller thickness than the upper part thereof.

When the inactive part 325 is formed at the lower part of the multilayer chamber 320, the upper coupling part 341 and the lower coupling part 342 are formed to be concentrated at the rear side of the multilayer chamber 320, and the lower coupling part 342 is formed to have a width greater than that of the upper coupling part 341, the multilayer chamber 320 and the front chamber layer 311 may form a concave space which is opened toward the head of the passenger, like a glove.

As the concave space is formed, the cushion 300 of the curtain air bag device may elastically hold the entire circumference of the head H of the passenger, including the side surface and the top surface of the head H, while coming in contact with the head H at various angles, when the vehicle collides. Thus, any impact forces that may be applied to the head H of the passenger can be distributed and reduced.

In accordance with an exemplary embodiment of the present invention, a part of the cushion 300 of the curtain air bag device may protrude toward the drive air bag as a result of the multilayer chamber 320, which is inflated in the lateral direction while forming a plurality of gas layers, when the vehicle is involved in a collision.

Thus, when the vehicle is involved in a collision, the space formed between the drive air bag and the cushion 300 of the curtain air bag device may be significantly reduced, or a path extending from the head of the passenger toward the space may be blocked. Thus, it is possible to prevent an injury of the passenger, which may occur when the head of the passenger is inserted into the space between drive air bag and the cushion 300.

Furthermore, when the vehicle is involved in a collision, the single-layer chamber 311 extending in the front-rear direction and the multilayer chamber 320 inflated in the lateral direction may form a three-dimensional contact surface connected from the side part to the front side as indicated by C and D in FIGS. 4A and 4B.

Thus, when the vehicle is involved in a collision, the head of the passenger comes in contact with the cushion 300 of the curtain air bag device in various directions including the side part and the front part. Therefore, a part of the head H of the passenger may be stuck in the cushion 300 of the curtain air bag device, which makes it possible to reduce the possibility of and/or the severity of injury of the passenger, which may occur when the head H of the passenger is rapidly tilted in the left or right direction.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A cushion of a curtain air bag device for a vehicle, comprising:
    a single-layer chamber configured to receive gas from an inflator and to spread to form a single gas layer whenever a vehicle is involved in a collision;
    a multilayer chamber comprising a plurality of layers overlapping each other, and configured to communicate with the single-layer chamber;
    a sealing part configured to seal edges of the single-layer chamber and the multilayer chamber;
    a coupling part integrally connecting an overlapping part of the sealing part formed at the edge of the multilayer chamber; and
    an inactive part formed on the multilayer chamber, wherein the inactive part is not expandable.

2. The cushion of claim 1, wherein the multilayer chamber comprises:
    a first chamber layer extending from a front side of the vehicle to a rear side of the vehicle;
    a second chamber layer communicating with the first chamber layer and extending toward the front side while overlapping the first chamber layer; and
    a third chamber layer communicating with the second chamber layer, and extending toward the rear side while overlapping the first and second chamber layers.

3. The cushion of claim 2, wherein the single-layer chamber comprises:
    a front chamber layer communicating with the first chamber layer; and
    a rear chamber layer formed at a rear side of the front chamber layer and communicating with the third chamber layer.

4. The cushion of claim 2, wherein, whenever the multilayer chamber is spread, a total thickness formed by the first to third chamber layers, or adhesion among the first to third chamber layers, is not uniform, but differs at different positions in the first to third chamber layers.

5. The cushion of claim 4, wherein, when the inactive part is formed at a lower part of the boundary between the second and third chamber layers, a lower part of the multilayer chamber has a thickness less than that of an upper part thereof in a state where the multilayer chamber is spread, and the adhesion among the first to third chambers decreases.

6. The cushion of claim 4, wherein, when the inactive part is formed at a lower part of the multilayer chamber at which the head of a passenger is positioned, an upper part of the multilayer chamber is inflated more than the lower part thereof.

7. The cushion of claim 1, wherein the coupling part comprises:
    an upper coupling part coupling a plurality of layers of the sealing part formed at the upper part of the multilayer chamber; and
    a lower coupling part coupling the plurality of layers of the sealing part formed at the lower part of the multilayer chamber.

8. The cushion of claim 7, wherein the coupling part connects the respective layers of the sealing part by sewing the layers in a lateral direction.

9. The cushion of claim 7, wherein the coupling part determines the thickness of the multilayer chamber in an inflated state using widths of the upper coupling part and the lower coupling part.

10. The cushion of claim 9, wherein:
    as the width of the upper coupling part is increased, the thickness of the upper part of the multilayer chamber is reduced; and
    as the width of the lower coupling part is increased, the thickness of the lower part of the multilayer chamber is reduced.

11. The cushion of claim 7, wherein, when the lower coupling part has a width greater than that of the upper coupling part, the upper part of the multilayer chamber has a thickness less than that of the lower part thereof.

12. The cushion of claim 1, wherein:
    the sealing part comprises a gas introduction part formed therein; and
    the gas introduction part forms a path through which the gas supplied from the inflator is introduced into the single-layer chamber and the multilayer chamber via the sealing part.

* * * * *